(12) United States Patent
Li (10) Patent No.: US 10,347,023 B2
(45) Date of Patent: Jul. 9, 2019

(54) DATA DRAWING METHOD AND APPARATUS, TERMINAL, AND STORAGE MEDIUM

(71) Applicant: Tencent Technology (Shenzhen) Company Limited, Shenzhen (CN)

(72) Inventor: Yifei Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 54 days.

(21) Appl. No.: 15/827,647

(22) Filed: Nov. 30, 2017

(65) Prior Publication Data
US 2018/0082450 A1    Mar. 22, 2018

Related U.S. Application Data (63) Continuation-in-part of application No. PCT/CN2016/104240, filed on Nov. 1, 2016.

(30) Foreign Application Priority Data

Jan. 22, 2016 (CN) .......................... 2016 1 0043870

(51) Int. Cl.
*G06T 11/20* (2006.01)
*G06F 16/958* (2019.01)
(Continued)

(52) U.S. Cl.
CPC ............ *G06T 11/206* (2013.01); *G06F 16/00* (2019.01); *G06F 16/958* (2019.01); *G06T 11/60* (2013.01)

(58) Field of Classification Search
CPC ............................... G06T 11/206; G06T 17/05
See application file for complete search history.

(56) References Cited

U.S. PATENT DOCUMENTS

| 2012/0194734 A1* | 8/2012 | McConville ... H04N 21/234327 348/441 |
| 2013/0044260 A1* | 2/2013 | Vestergaard ............ G06F 3/14 348/515 |

(Continued)

FOREIGN PATENT DOCUMENTS

| CN | 101425238 A | 5/2009 |
| CN | 102722349 A | 10/2012 |

(Continued)

OTHER PUBLICATIONS

Tencent Technology, ISRWO, PCT/CN2016/104240, Feb. 4, 2017, 7 pgs.

(Continued)

*Primary Examiner* — Phi Hoang
(74) *Attorney, Agent, or Firm* — Morgan, Lewis & Bockius LLP (57) ABSTRACT

Embodiments of the present disclosure disclose a data drawing method performed at a computer, the method including: obtaining a plurality of to-be-drawn data from a remote server, wherein the plurality of to-be-drawn data are to be rendered in a browser as an image within a preset image display time period; setting a plurality of plotting canvases on the browser, wherein a quantity of the plotting canvases depends on the preset image display time period and the plurality of to-be-drawn data; dividing the plurality of to-be-drawn data into a plurality of data groups, a quantity of the data groups being same as the quantity of the plotting canvases; respectively allocating each data group to a corresponding plotting canvas; and drawing a sub-image of each data group on a corresponding plotting canvas and immediately rendering the sub-image in the browser within the preset image display time period.

20 Claims, 3 Drawing Sheets

(51) Int. Cl.
*G06T 11/60* (2006.01)
*G06F 16/00* (2019.01)

(56) References Cited

U.S. PATENT DOCUMENTS

| | | | | |
|---|---|---|---|---|
| 2013/0080504 | A1* | 3/2013 | Maurer | G06T 17/05 |
| | | | | 709/203 |
| 2013/0254675 | A1* | 9/2013 | de Andrade | H04L 69/08 |
| | | | | 715/746 |
| 2014/0047413 | A1* | 2/2014 | Sheive | H04L 65/403 |
| | | | | 717/110 |
| 2014/0208246 | A1* | 7/2014 | Raub | G06F 3/04812 |
| | | | | 715/765 |
| 2015/0229960 | A1 | 8/2015 | Yamasaki et al. | |
| 2016/0026730 | A1* | 1/2016 | Hasan | G06F 16/986 |
| | | | | 715/234 |
| 2016/0162171 | A1* | 6/2016 | Yi | G06F 9/5044 |
| | | | | 715/211 |

FOREIGN PATENT DOCUMENTS

| | | |
|---|---|---|
| CN | 103699975 A | 4/2014 |
| CN | 103902294 A | 7/2014 |
| CN | 104851120 A | 8/2015 |

OTHER PUBLICATIONS

Tencent Technology, IPRP, PCT/CN2016/104240, Jul. 24, 2018, 6 pgs.

\* cited by examiner

DATA DRAWING METHOD AND APPARATUS, TERMINAL, AND STORAGE MEDIUM

PRIORITY CLAIM AND RELATED APPLICATION

This patent application is a continuation-in-part application of PCT/CN2016/104240, entitled "DATA DRAWING METHOD AND APPARATUS, TERMINAL, AND STORAGE MEDIUM" filed on Nov. 1, 2016, which claims priority to Chinese Patent Application No. 201610043870.6, entitled "DATA DRAWING METHOD AND APPARATUS" filed on Jan. 22, 2016, both of which are incorporated by reference in their entirety.

FIELD OF THE TECHNOLOGY

The present disclosure relates to the field of communications technologies, and to a data drawing method and apparatus, a terminal, and a storage medium.

BACKGROUND OF THE DISCLOSURE

HTML5, short for H5, is the latest revision of Hyper Text Markup Language (HTML), and the standard development is completed by the World Wide Web Consortium (W3C) in October 2014. An objective of the H5 is to replace HTML 4.01 and XHTML 1.0 standards developed in 1999, to make a network standard meet current network requirements during the rapid development of Internet applications.

An effective plotting canvas provided for the H5 by a Canvas may use a JavaScript script to draw a graphic on a web page, for example, draw an image, compose a photograph, create an animation, even perform real-time video processing and rendering, and the like.

During researching and practicing the existing technology, an inventor of the present disclosure finds that when the Canvas draws images of data, the images of the data are displayed only after all images of to-be-drawn data are drawn. Therefore, when the Canvas is used to draw images of a large quantity of data, a time period of drawing data images will be relatively long, causing a relatively long display time period of the data images and an apparent display delay.

SUMMARY

Embodiments of the present disclosure provide a data drawing method and apparatus, a terminal, and a storage medium, being capable of resolving technical problems that when a Canvas is used to draw images of a large quantity of data, a time period of drawing data images will be relatively long, causing a relatively long display time period of the data images and an apparent display delay.

According to one aspect, an embodiment of the present disclosure provides a data drawing method performed at a computer having one or more processors and memory storing one or more programs to be executed by the one or more processors, the method comprising:

obtaining a plurality of to-be-drawn data from a remote server, wherein the plurality of to-be-drawn data are to be rendered in a browser as an image within a preset image display time period;

setting a plurality of plotting canvases on the browser, wherein a quantity of the plotting canvases depends on the preset image display time period and the plurality of to-be-drawn data;

dividing the plurality of to-be-drawn data into a plurality of data groups, each data group being composed of at least one to-be-drawn datum, and a quantity of the data groups being same as the quantity of the plotting canvases;

respectively allocating each data group to a corresponding plotting canvas; and drawing a sub-image of each data group on a corresponding plotting canvas and immediately rendering the sub-image in the browser within the preset image display time period.

According to another aspect, an embodiment of the present disclosure further provides a computer having one or more processors, memory and one or more programs stored in the memory that, when executed by the one or more processors, cause the computer to perform the aforementioned data drawing method.

According to yet another aspect, an embodiment of the present disclosure provides a non-transitory computer readable storage medium storing one or more programs, wherein the one or more programs, when executed by a computer having one or more processors, cause the computer to perform the aforementioned data drawing method.

In the embodiments of the present disclosure, a plurality of plotting canvases is set on a browser; then a plurality of to-be-drawn data is obtained, and the plurality of to-be-drawn data is grouped to obtain a plurality of data groups, each data group being composed of at least one to-be-drawn datum, and a quantity of the data groups being same as a quantity of the plotting canvases; a corresponding data group is respectively allocated to each plotting canvas, one data group being corresponding to one plotting canvas; and the plotting canvases are used to perform image drawing on the data groups corresponding to the plotting canvases. In this solution, all the to-be-drawn data may be divided into a plurality of groups of data, and the plurality of plotting canvases is used to respectively perform drawing on the plurality of groups of the to-be-drawn data, therefore, a time period of the plotting canvas (for example, a Canvas) drawing a data image is shortened, and in comparison with the existing technology, a display time period of the data image is shortened, and a display delay is reduced.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The following clearly and completely describes the technical solutions in embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

The embodiments of the present disclosure provide a data drawing method and apparatus, a terminal, and a storage medium. Detailed descriptions are made below separately.

This embodiment is described from the perspective of a data drawing apparatus. The data drawing apparatus may be integrated in a terminal or other devices needing to perform data drawing.

A data drawing method includes: setting a plurality of plotting canvases on a browser; then obtaining a plurality of to-be-drawn data, and dividing the plurality of to-be-drawn data into a plurality of data groups, each data group being composed of at least one to-be-drawn datum, and a quantity of the data groups being same as a quantity of the plotting canvases; respectively allocating each data group to a corresponding plotting canvas, one data group being corresponding to one plotting canvas; and drawing a sub-image of each data group on a corresponding plotting canvas and immediately rendering the sub-image in the browser within the preset image display time period.

Figure 1:
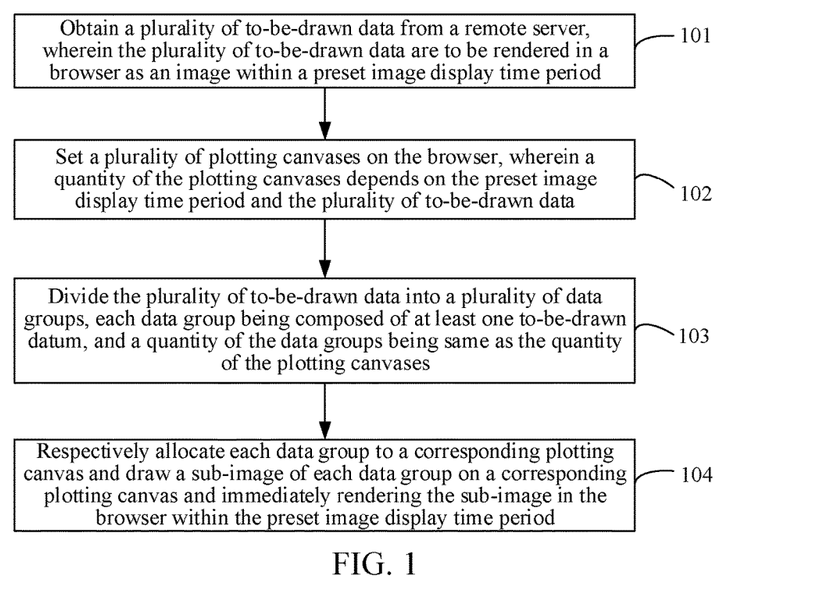
FIG. 1 is a flowchart of a data drawing method provided in an embodiment of the present disclosure.

As shown in FIG. 1, an implementation procedure of the data drawing may be as follows.

Operation S101: Obtain a plurality of to-be-drawn data from a remote server, wherein the plurality of to-be-drawn data are to be rendered in a browser as an image within a preset image display time period.

In some embodiments, the plurality of to-be-drawn data to be rendered correspond to part of a web page, e.g., a geographical map. Different types of web page have different requirements on how long it takes to render the image as defined by the preset image display time period ranging from, e.g., 0.1 second to 1 second.

Operation S102: Set a plurality of plotting canvases on the browser, wherein a quantity of the plotting canvases depends on the preset image display time period and the plurality of to-be-drawn data.

The browser may be a browser supporting a plotting canvas of an H5, for example, the Google Chrome, the Firefox, the Opera, the QQ Browser, the Internet Explorer, and other mainstream browsers. The plotting canvas may be a Canvas canvas.

The plurality of plotting canvases may be located on different layers. In this case, the plurality of plotting canvases may be a plurality of layers of plotting canvases. For example, the plurality of plotting canvases are overlapped in a position on the browser, which saves browser resources.

Operation 103: Divide the plurality of to-be-drawn data into a plurality of data groups, each data group being composed of at least one to-be-drawn datum, and a quantity of the data groups being same as the quantity of the plotting canvases.

In this embodiment, there are multiple manners for grouping the data. For example, all the to-be-drawn data may be divided equally to form a plurality of data groups with a same quantity of data, that is, the quantity of the to-be-drawn data in each data group is the same. An example in which there are m to-be-drawn data is used. In this case, the m data may be divided equally into n data groups, and each data group includes a same quantity of data. For another example, all the to-be-drawn data may be divided to form a plurality of data groups with different quantities of data, that is, the quantity of data in each data group is different. In other embodiments of the present disclosure, a grouping or dividing manner, and the quantity of data included in each data group may be specified according to actual needs. For example, when ten Canvas canvases are set, 100,000 data are divided into ten groups, and the quantities of data in the ten groups may be the same or different, or several groups in the ten groups have a same quantity of data and several groups have different quantities of data.

In this embodiment, the to-be-drawn data may be of multiple types, for example, may be positioning data.

Operation S104: Respectively allocate each data group to a corresponding plotting canvas and draw a sub-image of each data group on a corresponding plotting canvas and immediately rendering the sub-image in the browser within the preset image display time period.

In this embodiment, manners for respectively allocating the corresponding data group to each plotting canvas are multiple, for example, may be sequentially allocating the corresponding data group to each plotting canvas, or simultaneously allocating the corresponding data group to each plotting canvas. The manner for sequentially allocating the corresponding data group to each plotting canvas is as follows.

(1). The corresponding data group may be sequentially allocated to each plotting canvas according to identifiers of the plotting canvases. For example, the corresponding data group may be sequentially allocated to each plotting canvas according to sequences of the identifiers. Assuming that five Canvas canvases are set, namely, canvas 1, canvas 2, canvas 3, canvas 4, and canvas 5, and 100,000 data are divided into five data groups, including data group 1, data group 2, data group 3, data group 4, and data group 5. In this case, the data group 1 may be first allocated to the canvas 1, and then the data group 2 is allocated to the canvas 2, and so forth. At last, the data group 5 is allocated to the canvas 5.

(2). When the plurality of plotting canvases is located on different layers, the corresponding data group may be sequentially allocated to each plotting canvas according to the layers corresponding to the plotting canvases. For example, the corresponding data group may be sequentially allocated to each plotting canvas according to a sequence from top layer to bottom layer.

As noted above, there is a preset image display time period for rendering the image in the browser. In order to meet this time requirement, the image is divided into a plurality of sub-images, each sub-image corresponding to a respective data group. The different sub-images corresponding to different plotting canvas are rendered independently such that at least one sub-image is rendered within the preset image display time period.

For example, each Canvas canvas is used to perform the image drawing on the to-be-drawn data in the data group corresponding to the Canvas canvas. The performing the image drawing on the data groups refers to drawing an image of each to-be-drawn datum in the data groups.

In other embodiments of the present disclosure, manners for drawing a sub-image of each data group on a corresponding plotting canvas and immediately rendering the sub-image in the browser within the preset image display time period are multiple, for example, may be simultaneously using the plotting canvases to perform the image drawing on the data groups corresponding to the plotting canvases. Assuming that there are ten Canvas canvases, the ten Canvas canvases are simultaneously used to perform the image drawing on the data group corresponding to each plotting canvas. This manner may greatly reduce a time period of the plotting canvas performing the image drawing, and shorten a display time period of data images.

The plurality of plotting canvases is simultaneously used to perform the image drawing. When a quantity of the data is relatively large, a situation in which a large quantity of the data images are suddenly displayed will occur, causing frame freezing and unsmooth playback of displaying the data images. Therefore, in this embodiment, the manner for performing the image drawing may further be sequentially using the plotting canvases to perform the image drawing on the data groups corresponding to the plotting canvases. Assuming that there are N Canvas canvases, first, the first Canvas canvas is used to perform the image drawing on a data group corresponding to the first Canvas canvas, and then the second Canvas canvas is used to perform the image drawing on a data group corresponding to the second Canvas canvas, . . . , and the $N^{th}$ Canvas canvas is used to perform the image drawing on a data group corresponding to the $N^{th}$ Canvas canvas. Sequentially using the plotting canvases to perform the image drawing makes the data images be displayed sequentially, and may improve a display effect of the data images.

In other embodiments of the present disclosure, to further shorten the display time period and improve the display effect of the data images, this embodiment may be combined with a refresh rate of the browser to perform the image drawing. That is, step of sequentially using the plotting canvases to perform the image drawing on the data groups corresponding to the plotting canvases may include: sequentially using, according to the refresh rate of the browser, the plotting canvases to perform the image drawing on the data groups corresponding to the plotting canvases. For example, a time interval of drawing images may be determined according to the refresh rate of the browser, and then, the plotting canvases are sequentially used, according to the time interval, to perform the image drawing on the data groups corresponding to the plotting canvases.

For example, when the plotting canvases are the Canvas canvases, a drawCanvas main step function and a drawSingleCanvas sub step function may be compiled by using s. The drawCanvas is used for a whole entry, and a variable n is set to collect statistics about current progress to which the drawSingleCanvas is executed. The drawSingleCanvas operates each Canvas to perform the image drawing, and each time a canvas is operated to perform the image drawing, n++ is executed. In the drawSingleCanvas, a requestAnimationFrame may be used to coordinate with cyclical drawing of the refresh rate of the browser. A cyclical execution queue is constructed, and a determining logic is added. When n equals N, execution is stopped, where N is a total quantity of the Canvas canvases.

In other embodiments of the present disclosure, the set quantity of the plotting canvases in this embodiment may be determined according to a preset image display time period and a quantity of the to-be-drawn data. That is, step of setting a plurality of plotting canvases on a browser may include: determining, according to the preset image display time period and the preset quantity of the to-be-drawn data, a quantity of needed plotting canvases, the quantity being greater than 1; and setting, according to the determined quantity, a corresponding quantity of the plotting canvases on the browser.

For example, the quantity of the to-be-drawn data that are drawn in one time is specified to p, and the preset image display time period is specified to T. First, all the to-be-drawn data are divided into q portions. It is determined whether a time period t of using the plotting canvases to draw and display images of p/q to-be-drawn data is less than or equal to T, if t is less than or equal to T, it is determined that q is the quantity of the plotting canvases needing to be set; and if t is not less than or equal to T, all the to-be-drawn data are divided again. An example in which p is 1,000,000 and T is 0.05 s is used. First, all the to-be-drawn data are divided into 10 portions. It is determined that whether a time period t of using the plotting canvases to display images of 100,000 to-be-drawn data is less than or equal to T. In this case, t is 0.1, which is greater than 0.05. Therefore, the divided portions still need to be increased. All the to-be-drawn data are divided again until that t is less than T. If t is less than T, it is determined that current divided portions are the quantity of the plotting canvases needing to be set. The preset image display time period may be set according to actual needs and/or the refresh rate of the web browser.

It can be known from the above that, in this embodiment of the present disclosure, a plurality of plotting canvases is set on a browser; then a plurality of to-be-drawn data is obtained, and the plurality of to-be-drawn data is grouped to obtain a plurality of data groups, each data group being composed of at least one to-be-drawn datum, and a quantity of the data groups being same as a quantity of the plotting canvases; a corresponding data group is respectively allocated to each plotting canvas, one data group being corresponding to one plotting canvas; and the plotting canvases are used to perform image drawing on the data groups corresponding to the plotting canvases. In this solution, all the to-be-drawn data may be divided into a plurality of groups of data, and the plurality of plotting canvases is used to respectively perform drawing on the plurality of groups of the to-be-drawn data, therefore, a time period of the plotting canvas (for example, a Canvas) drawing a data image is shortened, and in comparison with the existing technology, a display time period of the data image is shortened, and a display delay is reduced. In addition, in this embodiment of the present disclosure, the plotting canvases may be sequentially used, according to a refresh rate of the browser to perform drawing, fastening rate of image display, further shortening a time period of the image display, adding a gradient animation effect to the image display, and improving user experience.

Detailed descriptions are further made in the following with an example according to the method described in FIG. 1.

Figure 2:
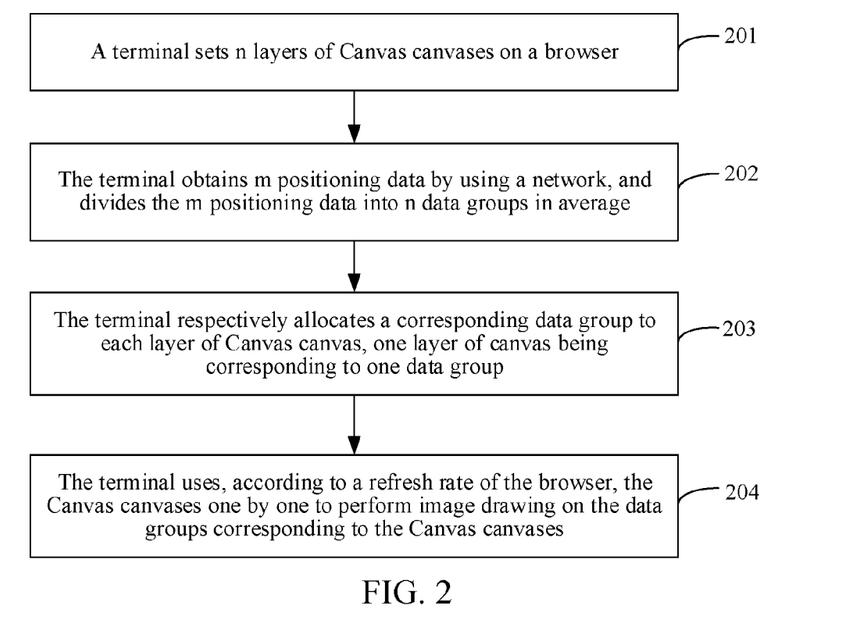
FIG. 2 is another flowchart of a data drawing method provided in an embodiment of the present disclosure.

In this embodiment, an example in which the to-be-drawn data are positioning data, n layers of the Canvas canvases are set, and the data drawing apparatus is integrated in a terminal such as a mobile phone or a personal computer is used for detailed descriptions.

As shown in FIG. 2, an implementation procedure of the data drawing may be as follows.

Operation S201: A terminal sets n layers of Canvas canvases on a browser, n being a positive integer greater than 1.

For example, ten layers of Canvas canvases which are overlapped are set on the QQ browser.

A value range of n may be determined by a preset image display time period and a total quantity of the positioning data. For example, when a display time period of 1/a Canvas data is less than or equal to the preset image display time period, it is determined that n=a, where a is a positive integer greater than 1.

Operation S202: The terminal obtains m positioning data by using a network, and divides the m positioning data into n data groups in average.

A quantity of the data groups is equal to a quantity of the canvases. A quantity of the positioning data in each data group is the same, and each data group includes m/n positioning data, where a value of m/n is a positive integer.

During actual application, the quantity of the to-be-drawn data is of a mega-class, that is, the unit of m may be million. For example, when ten Canvas canvases are set, and 1,000,000 positioning data need to be drawn, the 1,000,000 positioning data are divided into ten data groups in average, and each data group is composed of 100,000 positioning data.

Operation S203: The terminal respectively allocates a corresponding data group to each layer of the Canvas canvas, one layer of Canvas canvas being corresponding to one data group.

For example, the corresponding data group is sequentially allocated to each layer of the Canvas canvas according to a sequence from the bottom layer to the top layer, or the corresponding data group is simultaneously allocated to each layer of the Canvas canvas.

An example in which there are 10 layers of the canvases is used. The first data group may be allocated to the first layer of the Canvas canvas, the second data group is allocated to the second layer of the Canvas canvas, . . . , and the tenth data group is allocated to the tenth layer of the Canvas canvas.

Operation S204: The terminal uses, according to a refresh rate of the browser, the Canvas canvases one by one to perform image drawing on the data groups corresponding to the Canvas canvases.

In other embodiments of the present disclosure, a time interval of the image drawing may be determined according to the refresh rate, and the Canvas canvases may be used one by one, according to the refresh rate, to perform the image drawing. For example, a timer may be set, and a time of the timer is set according to the time interval. After a current layer of the Canvas canvas is used to perform the image drawing, the timer is started. When the time of the timer is 0, a next layer of the Canvas canvas is used to perform the image drawing. In this embodiment, a timer may be set for each layer of the Canvas canvas, to trigger using each layer of the Canvas canvas to perform the image drawing.

In other embodiments of the present disclosure, this embodiment may perform the image drawing one by one according to the time interval and a layer sequence of the canvases.

The using the Canvas canvases to perform the image drawing on the data groups may be using the Canvas canvases to perform the image drawing on all the positioning data in the data groups. Corresponding images of the positioning data may be bright dots or star dots. In this case, this embodiment method may be used to draw a positioning star cloud image. During actual application, a to-be-drawn image may be specified according to actual needs.

For example, an example in which there are ten layers of the canvases is used. First, the first layer of the Canvas canvas is used to perform the image drawing on data group 1. After a preset time period (the preset time period is the time interval determined above), the second layer of the Canvas canvas is used to perform the image drawing on data group 2. After the preset time period, the third layer of the Canvas canvas is used to perform the image drawing on data group 3, and so forth. At last, the tenth layer of the Canvas canvas is used to perform the image drawing on data group 10.

It can be known from the above that, in this embodiment of the present disclosure, a terminal sets n layers of Canvas canvases on a browser; then the terminal obtains m positioning data by using a network, and divides the m positioning data into n data groups in average; the terminal respectively allocates a corresponding data group to each layer of the Canvas canvas; and the terminal uses, according to a refresh rate of the browser, the Canvas canvases one by one to perform image drawing on the data groups corresponding to the Canvas canvases. In this solution, all the positioning data may be divided into a plurality of groups of data, and the Canvas canvases are used one by one, according to the refresh rate of the browser, to perform the image drawing on the data groups corresponding to the Canvas canvases, therefore, a time period of the Canvas canvas drawing an image of the positioning datum is shortened, and in comparison with the existing technology, a display time period of the image of the positioning datum is shortened, and a display delay is reduced. In addition, a gradient animation effect may be added to display of the image of the positioning datum, and user experience is improved.

Figure 3:
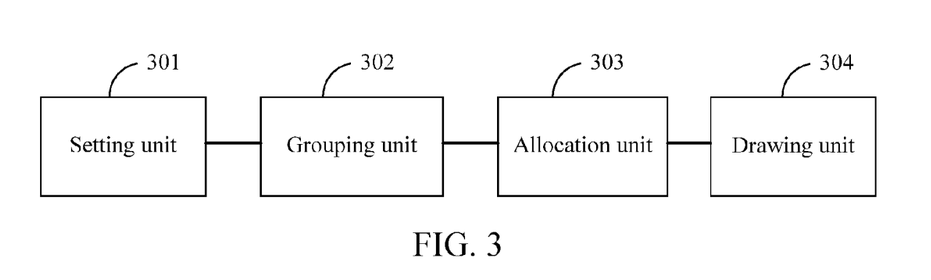
FIG. 3 is a schematic structural diagram of a data drawing apparatus according to an embodiment of the present disclosure.

To better implement the method above, an embodiment of the present disclosure further provides a data drawing apparatus. As shown in FIG. 3, the data drawing apparatus may further include a setting unit 301, a grouping unit 302, an allocation unit 303, and a drawing unit 304.

The setting unit 301 is configured to set a plurality of plotting canvases on a browser.

The grouping unit 302 is configured to obtain a plurality of to-be-drawn data, and group the plurality of to-be-drawn data to obtain a plurality of data groups, each data group being composed of at least one to-be-drawn datum, and a quantity of the data groups being same as a quantity of the plotting canvases.

The allocation unit 303 is configured to respectively allocate a corresponding data group to each plotting canvas, one data group being corresponding to one plotting canvas.

The drawing unit 304 is configured to use the plotting canvases to perform image drawing on the data groups corresponding to the plotting canvases.

For example, to further shorten an image display time period and prompt an image display effect, the drawing unit 304 may be configured to sequentially use the plotting canvases to perform the image drawing on the data groups corresponding to the plotting canvases.

For another example, to further shorten the image display time period and prompt the image display effect, the drawing unit 304 may be configured to sequentially use, according to a refresh rate of the browser, the plotting canvases to perform the image drawing on the data groups corresponding to the plotting canvases.

In other embodiments of the present disclosure, the drawing unit 304 may include a determining subunit and an image drawing subunit.

The determining subunit is configured to determine, according to the refresh rate of the browser, a time interval of drawing an image.

The image drawing subunit is configured to sequentially use, according to the time interval, the plotting canvases to perform the image drawing on the data groups corresponding to the plotting canvases.

In other embodiments of the present disclosure, the setting unit 301 may be configured to: determine, according to a preset image display time period and a preset quantity of the to-be-drawn data, a quantity of needed plotting canvases, the quantity being greater than 1; and set, according to the determined quantity, a corresponding quantity of the plotting canvases on the browser.

During implementation, the units above may be implemented as independent entities, or may be combined randomly to be implemented as a same entity or several entities. Referring to the foregoing method embodiments for implementations of the units above, which are not further described herein.

The data drawing apparatus may be integrated in a terminal or other devices needing to perform data drawing. Manners for the data drawing apparatus being integrated in a terminal are multiple, for example, integrated as a form of a client, or other software in the terminal.

It can be known from the above, in the data drawing apparatus of this embodiment of the present disclosure, a setting unit 301 sets a plurality of plotting canvases on a browser; then a grouping unit 302 obtains a plurality of to-be-drawn data, and groups the plurality of to-be-drawn data to obtain a plurality of data groups, each data group being composed of at least one to-be-drawn datum, and a quantity of the data groups being same as a quantity of the plotting canvases; an allocation unit 303 respectively allocates a corresponding data group to each plotting canvas, one data group being corresponding to one plotting canvas; and a drawing unit 304 uses the plotting canvases to perform image drawing on the data groups corresponding to the plotting canvases. In this solution, all the to-be-drawn data may be divided into a plurality of groups of data, and the plurality of plotting canvases is used to respectively perform drawing on the plurality of groups of the to-be-drawn data, therefore, a time period of the plotting canvas (for example, a Canvas) drawing a data image is shortened, and in comparison with the existing technology, a display time period of the data image is shortened, and a display delay is reduced. In addition, in this embodiment of the present disclosure, the plotting canvases may be sequentially used according to a refresh rate of the browser to perform drawing, fastening a rate of image display, further shortening a time period of the image display, adding a gradient animation effect to the image display, and improving user experience.

All the units and the subunits included in the units that are included in the data drawing apparatus in the embodiments of the present disclosure may be implemented by using a processor in the terminal, or may be implemented by using a logic circuit certainly. During implementation, the processor may be a central processing unit (CPU), a microprocessor (MPU), a digital signal processor (DSP), a field programmable gate array (FPGA), or the like.

It should be noted that, in the embodiments of the present disclosure, if implemented in the form of software functional modules and sold or used as an independent product, the data drawing method described above may also be stored in a computer-readable storage medium. Based on such an understanding, the technical solutions of the embodiments of the present disclosure essentially, or the part contributing to the existing technology may be implemented in a form of a software product. The software product is stored in a storage medium, and includes several instructions for instructing a computer device (which may be a personal computer, a server, or a network device) to perform all or a part of the methods described in the embodiments of the present disclosure. The foregoing storage medium includes: any medium that can store program code, such as a USB flash drive, a removable hard disk, a read-only memory (ROM), a magnetic disk, or an optical disc. The embodiments of the present disclosure are not limited to any specific combination of hardware and software.

Correspondingly, an embodiment of the present disclosure further provides a computer storage medium, the computer storage medium storing a computer executable instruction, and the computer executable instruction being used to perform the data drawing method provided in the embodiments of the present disclosure.

Based on the foregoing embodiments, an embodiment of the present disclosure further provides a terminal, including a storage medium for storing an executable instruction and a processor, the processor being configured to execute the stored executable instruction, and the executable instruction including:

setting a plurality of plotting canvases on a browser;

obtaining a plurality of to-be-drawn data, and dividing the plurality of to-be-drawn data into a plurality of data groups, each data group being composed of at least one to-be-drawn datum, and a quantity of the data groups being same as a quantity of the plotting canvases;

respectively allocating each data group to a corresponding plotting canvas, one data group being corresponding to one plotting canvas; and drawing a sub-image of each data group on a corresponding plotting canvas and immediately rendering the sub-image in the browser within the preset image display time period.

A person of ordinary skill in the art may understand that all or part of the operations of the methods in the embodiments may be implemented by a program instructing relevant hardware. The program may be stored in a non-transitory computer readable storage medium, and the storage medium may include a ROM, a random access memory (RAM), a magnetic disk, an optical disk, and so on.

During implementation, the terminal may be implemented by using various types of electronic devices. For example, the electronic devices may include a smartphone, a notebook computer, a tablet computer (PAD), a portable media player (PMP), a navigation apparatus, and the like.

Figure 4:
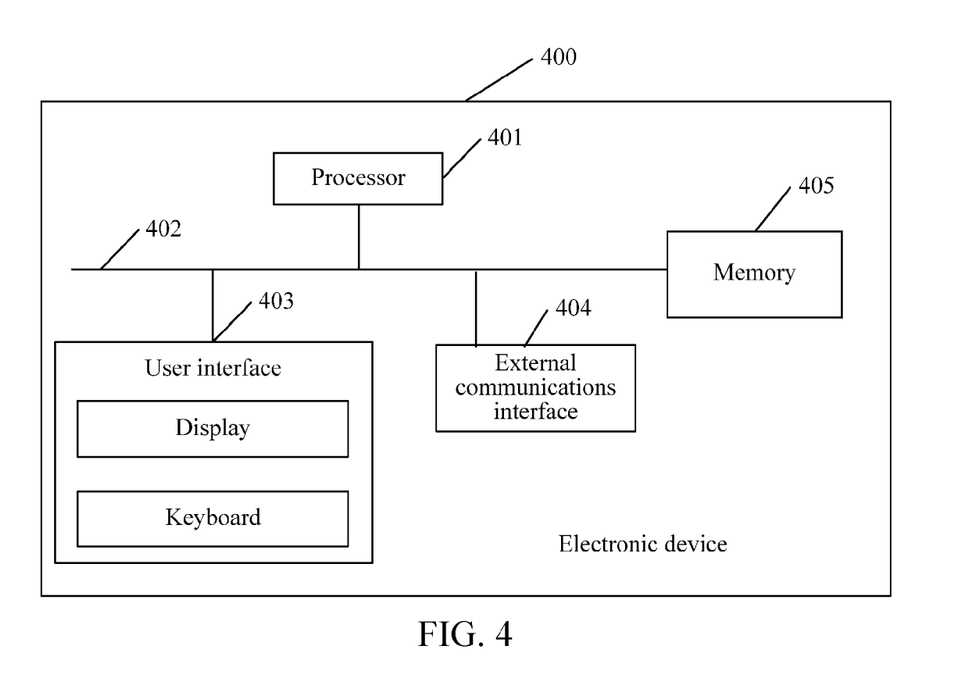
FIG. 4 is a schematic component structure diagram of an electronic device according to an embodiment of the present disclosure.

FIG. 4 is a schematic component structure diagram of an electronic device according to an embodiment of the present disclosure. As shown in FIG. 4, a computer device 400 may include: at least one processor 401, at least one communications bus 402, a user interface 403, at least one external communications interface 404, and a memory 405. The communications bus 402 is configured to implement connection and communication between the components. The user interface 403 may include a display and a keyboard. Optionally, the communications interface 404 may include a standard wired interface and wireless interface.

A data drawing method and apparatus, a terminal, and a storage medium provided by the embodiments of the present disclosure are described in detail above. The embodiments of the present disclosure describe the principles and implementations of the present disclosure. The descriptions of the embodiments above are merely used to help to understand the methods and core ideas of the present disclosure. At the same time, for a person skilled in the art, the specific implementations and application ranges may be changed according to the ideas of the present disclosure. In a word, this specification should be understood as a limitation to the protection scope of the present disclosure.

INDUSTRIAL APPLICABILITY

In the embodiments of the present disclosure, a plurality of plotting canvases is set on a browser; then a plurality of to-be-drawn data is obtained, and the plurality of to-be-drawn data is grouped to obtain a plurality of data groups, each data group being composed of at least one to-be-drawn datum, and a quantity of the data groups being same as a quantity of the plotting canvases; a corresponding data group is respectively allocated to each plotting canvas, one data group being corresponding to one plotting canvas; and the plotting canvases are used to perform image drawing on the data groups corresponding to the plotting canvases. In this solution, all the to-be-drawn data may be divided into a plurality of groups of data, and the plurality of plotting canvases is used to respectively perform drawing on the plurality of groups of the to-be-drawn data, therefore, a time period of the plotting canvas drawing a data image is shortened, and in comparison with the existing technology, a display time period of the data image is shortened, and a display delay is reduced.

What is claimed is:

1. A data drawing method performed at a computer having one or more processors and memory storing one or more programs to be executed by the one or more processors, the method comprising:
    obtaining a plurality of to-be-drawn data from a remote server, wherein the plurality of to-be-drawn data are to be rendered in a browser as an image within a preset image display time period;
    setting a plurality of plotting canvases on the browser, wherein a quantity of the plotting canvases depends on the preset image display time period and the plurality of to-be-drawn data;
    dividing the plurality of to-be-drawn data into a plurality of data groups, each data group being composed of at least one to-be-drawn datum, and a quantity of the data groups being same as the quantity of the plotting canvases;
    respectively allocating each data group to a corresponding plotting canvas; and
    drawing a sub-image of each data group on a corresponding plotting canvas and immediately rendering the sub-image in the browser within the preset image display time period.

2. The data drawing method according to claim 1, wherein the drawing a sub-image of each data group on a corresponding plotting canvas and immediately rendering the sub-image in the browser within the preset image display time period comprises:
    sequentially using the plotting canvases to perform the image drawing on the data groups corresponding to the plotting canvases within the preset image display time period.

3. The data drawing method according to claim 2, wherein the sequentially using the plotting canvases to perform the image drawing on the data groups corresponding to the plotting canvases comprises:
    sequentially using, according to a refresh rate of the browser, the plotting canvases to perform the image drawing on the data groups corresponding to the plotting canvases.

4. The data drawing method according to claim 3, wherein the sequentially using, according to a refresh rate of the browser, the plotting canvases to perform the image drawing on the data groups corresponding to the plotting canvases comprises:
    determining, according to the refresh rate of the browser, a time interval of drawing an image; and
    sequentially using, according to the time interval, the plotting canvases to perform the image drawing on the data groups corresponding to the plotting canvases.

5. The data drawing method according to claim 1, wherein the plurality of plotting canvases are located on different layers of the browser.

6. The data drawing method according to claim 5, wherein the layers of plotting canvases are overlapped in a position on the browser.

7. The data drawing method according to claim 1, wherein each of the plurality of data groups has a same amount of data in size.

8. A computer having one or more processors, memory and one or more programs stored in the memory that, when executed by the one or more processors, cause the computer to perform a plurality of operations including:
    obtaining a plurality of to-be-drawn data from a remote server, wherein the plurality of to-be-drawn data are to be rendered in a browser as an image within a preset image display time period;
    setting a plurality of plotting canvases on the browser, wherein a quantity of the plotting canvases depends on the preset image display time period and the plurality of to-be-drawn data;
    dividing the plurality of to-be-drawn data into a plurality of data groups, each data group being composed of at least one to-be-drawn datum, and a quantity of the data groups being same as the quantity of the plotting canvases;
    respectively allocating each data group to a corresponding plotting canvas; and
    drawing a sub-image of each data group on a corresponding plotting canvas and immediately rendering the sub-image in the browser within the preset image display time period.

9. The computer according to claim 8, wherein the operation of drawing a sub-image of each data group on a corresponding plotting canvas and immediately rendering the sub-image in the browser within the preset image display time period comprises:
    sequentially using the plotting canvases to perform the image drawing on the data groups corresponding to the plotting canvases within the preset image display time period.

10. The computer according to claim 9, wherein the operation of sequentially using the plotting canvases to perform the image drawing on the data groups corresponding to the plotting canvases comprises:
    sequentially using, according to a refresh rate of the browser, the plotting canvases to perform the image drawing on the data groups corresponding to the plotting canvases.

11. The computer according to claim 10, wherein the operation of sequentially using, according to a refresh rate of the browser, the plotting canvases to perform the image drawing on the data groups corresponding to the plotting canvases comprises:
    determining, according to the refresh rate of the browser, a time interval of drawing an image; and
    sequentially using, according to the time interval, the plotting canvases to perform the image drawing on the data groups corresponding to the plotting canvases.

12. The computer according to claim 8, wherein the plurality of plotting canvases are located on different layers of the browser.

13. The computer according to claim 12, wherein the layers of plotting canvases are overlapped in a position on the browser.

14. The computer according to claim 8, wherein each of the plurality of data groups has a same amount of data in size.

15. A non-transitory computer readable storage medium storing one or more programs, wherein the one or more programs, when executed by a computer having one or more processors, cause the computer to perform a plurality of operations including:

obtaining a plurality of to-be-drawn data from a remote server, wherein the plurality of to-be-drawn data are to be rendered in a browser as an image within a preset image display time period;

setting a plurality of plotting canvases on the browser, wherein a quantity of the plotting canvases depends on the preset image display time period and the plurality of to-be-drawn data;

dividing the plurality of to-be-drawn data into a plurality of data groups, each data group being composed of at least one to-be-drawn datum, and a quantity of the data groups being same as the quantity of the plotting canvases;

respectively allocating each data group to a corresponding plotting canvas; and drawing a sub-image of each data group on a corresponding plotting canvas and immediately rendering the sub-image in the browser within the preset image display time period.

16. The non-transitory computer readable storage medium according to claim 15, wherein the operation of drawing a sub-image of each data group on a corresponding plotting canvas and immediately rendering the sub-image in the browser within the preset image display time period comprises:

sequentially using the plotting canvases to perform the image drawing on the data groups corresponding to the plotting canvases within the preset image display time period.

17. The non-transitory computer readable storage medium according to claim 16, wherein the operation of sequentially using the plotting canvases to perform the image drawing on the data groups corresponding to the plotting canvases comprises:

sequentially using, according to a refresh rate of the browser, the plotting canvases to perform the image drawing on the data groups corresponding to the plotting canvases.

18. The non-transitory computer readable storage medium according to claim 17, wherein the operation of sequentially using, according to a refresh rate of the browser, the plotting canvases to perform the image drawing on the data groups corresponding to the plotting canvases comprises:

determining, according to the refresh rate of the browser, a time interval of drawing an image; and sequentially using, according to the time interval, the plotting canvases to perform the image drawing on the data groups corresponding to the plotting canvases.

19. The non-transitory computer readable storage medium according to claim 15, wherein the plurality of plotting canvases are located on different layers of the browser.

20. The non-transitory computer readable storage medium according to claim 19, wherein the layers of plotting canvases are overlapped in a position on the browser.

* * * * *